Figure 3:
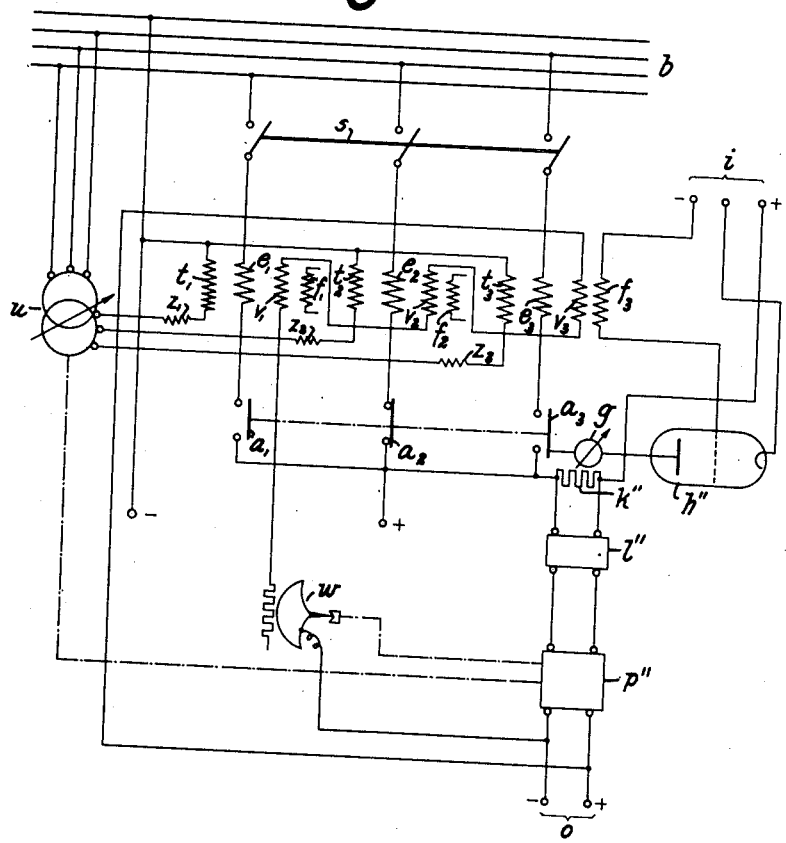

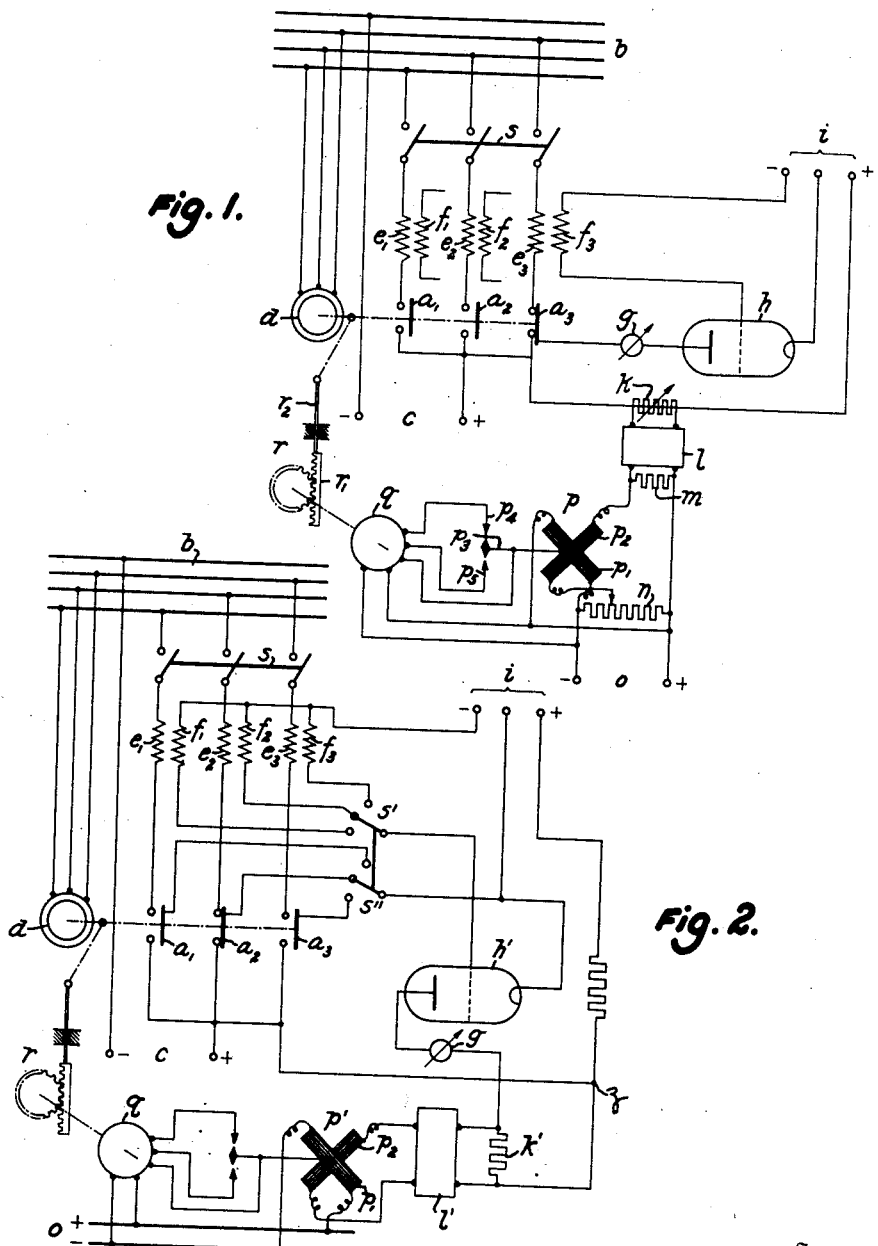

Patented June 19, 1951

2,557,739

UNITED STATES PATENT OFFICE 2,557,739

APPARATUS FOR CONTROLLING THE TIMING OF PERIODICALLY ACTUATED SWITCHES OF MECHANICAL CURRENT CONVERTERS

Alexander Goldstein and Hans Blatter, Wettingen, Switzerland, assignors to Aktiengesellschaft Brown, Boveri & Cie, Baden, Switzerland, a joint-stock company Application April 23, 1946, Serial No. 664,396
In Switzerland April 25, 1945

14 Claims. (Cl. 321—48)

This invention relates in general to electrical apparatus such as mechanical converters and the like which include periodically actuated switches for controlling the flow of current to a load.

An object of the invention is to provide a novel and improved apparatus for automatically regulating the duration of contact of periodically actuated contacts of a switch in accordance with the current in a load circuit that includes the switch contacts.

Another object is to provide an improved apparatus for determining the duration of contact of periodically actuated contacts of switch devices, especially the switches of mechanical converters, which include auxiliary devices such as chokes, commutating reactors, electronic valves, etc. that effect an interval of reduced current appropriate for opening of the switch contacts in a spark-free manner.

A more specific object is to provide an automatic control apparatus for regulating the timing of the operation of the contacts of mechanical type converters having auxiliary current damping devices by means of a control quantity that varies in magnitude as a function of the time interval between the beginning or alternatively the ending of the period of reduced current effected by the damping device and the opening of the rectifier contacts.

Another object is to derive a measured quantity the magnitude of which is indicative of the time interval from the instant at which the contacts of a mechanical type converter open to the instant at which the period of reduced current produced by a current damping device associated with the converter begins or alternatively terminates.

Another specific object is to provide an automatic control apparatus for mechanical type converters having auxiliary current damping devices in which the effect of these devices is regulated automatically to maintain a spark-free operating condition at the converter contacts.

Briefly, the present invention provides for derivation of a measured control quantity which varies as a function of change of current in the circuit in which the switch contacts and auxiliary current reducing devices are connected and the use of this control quantity in such manner that the switch contacts always open under optimum conditions. The novel apparatus for producing the control quantity comprises an auxiliary measuring circuit including therein a discharge tube of the grid control type, the grid being subjected to a control bias which varies with the effect produced by the auxiliary device, and the cathode-anode circuit of the tube being periodically conditioned for conduction in timed relation with operation of the switch contacts.

For purposes of illustrating one way in which the invention may be practiced we have chosen an application of it to mechanical rectifiers but we wish it to be understood that the principles of the invention may be applied to other types of electrical converter apparatus without departing from the spirit and scope of the appended claims.

In the art of mechanical rectifiers of the general type which comprise switch devices having contacts opened and closed synchronously with the alternations in an A. C. supply source, it has been the practice to incorporate auxiliary control devices in the primary side of the rectifier switch contacts such as valves, extinguishing condensers, switch chokes, commutating reactors, and the like in order to effect an interval of reduced primary current so that the contacts may open under relatively spark-free conditions. As the contacts are actuated periodically by a power drive which is synchronized with the alternations in the A. C. power supply, it is obvious that the timing of opening of the contacts is important and that contact opening should occur at the instant the switch chokes or other current reducing means have produced their optimum effect. Or stated briefly, the mechanical timing of the contact opening must bear the proper relation to the timing of the reduced current effect produced by the switch choke or equivalent device. It is also of advantage to keep track of the period during which the contacts are closed.

The desired manner of operation is obtained by use of the novel method and apparatus referred to above and the following drawings illustrate several different arrangements of rectifier apparatus incorporating the invention. In these, Fig. 1 is a diagrammatic view of one embodiment in which the control quantity is measured from a given instant preceding the opening of the contacts; Fig. 2 is a modified construction wherein the timing is measured from the instant that the contacts open; and in Fig. 3, the timing control is derived as in Fig. 1 but the control is utilized in a different manner to effect the desired result.

Referring now to Fig. 1, the contact bridges of a polyphase mechanical rectifier are designated by $a_1$, $a_2$ and $a_3$ which coact with opposed contacts. The latter are connected on one side to an alternating current network $b$ through commutating reactors or chokes $e_1$, $e_2$ and $e_3$ and switch $s$, and on the other side to feed a direct current system $c$.

The drive for actuating the contact bridges $a_1$, $a_2$, $a_3$ is indicated by motor $d$ which is connected to the network $b$. The operating mechanism for the timed lifting and lowering of the contact bridges has not been illustrated in detail since these are well known and can be chosen as desired.

The control quantity for regulating the contact timing is obtained through the use of a discharge tube $h$ which is of the grid control type. Its anode-cathode circuit is arranged to be opened and closed in timed relation with operation of the contacts $a_1$, $a_2$ and $a_3$. In the instant of rectifier operation illustrated by Fig. 1, the anode-cathode circuit is connected to the contacts $a_3$ but it is to be understood that this tube circuit would be switched over to the other contacts $a_1$, $a_2$ in succession in the switching sequence by conventional switching means such as is illustrated in Fig. 2 to be later described.

The grid of tube $h$ is normally biased negatively from an auxiliary voltage source $i$ and the grid circuit extends at the instant shown in the drawing from the source $i$ through winding $f_3$ inductively associated with the choke $e_3$. It is to be understood that the grid would also be switched to the other chokes $e_1$, $e_2$ in succession in the same manner as shown in Fig. 2 simultaneously with switching of the cathode-anode circuit to contacts $a_1$ and $a_2$.

The use of chokes in the primary of the rectifier is well known and hence the theory of their operation need not be detailed here. It is sufficient to say that at the beginning of the interval of reduced current effected by the choke $e_3$ the inductive effect inherent therein is sufficient to induce a potential pulse in the winding $f_3$ which is so connected in the grid circuit of the tube $h$ that the grid bias is swung positive and renders the tube conductive. As this takes place at a time shortly before the contacts $a_3$ are set to open current will flow in the cathode-anode circuit from the beginning of the interval of reduced current until the contacts $a_3$ open and break the circuit. Thus as the rectifier operates and the contacts $a_1$, $a_2$, $a_3$ periodically open and close, periodic pulses of direct current of constant amplitude flow in the anode-cathode circuit of the tube, and hence it now becomes obvious that the average flow of current in this tube circuit which can be observed by ammeter $g$ is a measure of the time between the instant at which the chokes $e_1$, $e_2$, $e_3$ begin to produce their interval of reduced current and the instant at which the contacts $a_1$, $a_2$, $a_3$ open.

To measure the average current in the tube circuit, a resistance $k$ is connected therein and the drop in voltage across this resistance will hence vary with the current.

The potential across resistance $k$ is used to regulate the timing of the rectifier contacts so that they always open at the optimum condition, i. e. substantially maximum reduction in current in the primary line. For this purpose, the voltage drop at resistance $k$ is fed into an amplifying device $l$. This amplifier is conventional in construction and hence is shown in block diagram. It may be of the tube or magnetic type with saturated iron chokes, as desired. Connected across the output of amplifier $l$ is a resistor $m$ that is connected to a selected portion of a manually adjustable voltage dividing resistor $n$ in such manner as to derive a voltage which represents the difference in the respective voltage drops across the two resistors.

An instrument type relay $p$ of the crossed coil type is used in the control and the contacts of this relay are connected in the circuit of a reversible motor $q$. Coil $p_1$ is connected directly to an auxiliary source of power indicated by conventional symbols and hence current through it remains constant. However coil $p_2$ is connected in the circuit between opposed resistors $m$ and $n$ and hence its current depends upon the unbalance between the voltage drop across these two resistors. The arrangement is such that when the current through coil $p_1$ of the instrument's moving system is equal to the current through coil $p_2$ which is at right angles to coil $p_1$, the contact arm $p_3$ will take a position between and spaced from the stationary contacts $p_4$, $p_5$ and the motor $q$ stands still. If however the two coil currents are unbalanced, the contact arm $p_3$ will be moved into engagement with one or the other of contacts $p_4$, $p_5$ dependent upon the direction of the unbalance and hence will cause motor $q$ to run in one direction or the other.

It will be seen from the drawing that the shaft of motor $q$ is connected to rotate a pinion gear $r$ that is meshed with a rack gear $r_1$ which is arranged through conventional mechanism to advance or retard the instant of opening of the contacts $a_1$, $a_2$, $a_3$ dependent upon the direction of motion of rod $r_2$.

The component parts of Fig. 1 are adjusted so that when the rectifier contacts are operating under optimum condition, i. e. without sparking, the drop across resistor $k$ and hence the resultant drop across resistor $m$ is such that the current through relay coil $p_2$ is equal to that through coil $p_1$ and hence motor $q$ stands still. However should the desired timing of the rectifier contacts $a_1$, $a_2$, $a_3$ relative to the operation of the commutating reactors $e_1$, $e_2$, $e_3$ shift in one direction or the other which would therefore cause the rectifier contacts to arc upon separation, this shift appears as a change in the conducting time of tube $h$ and hence changes the voltage drop across resistor $k$ and hence also the voltage drop across resistor $m$. In turn, the current through coil $p_2$ is changed and this causes relay $p$ to effect rotation of motor $q$ in the proper direction to readjust the timing of the contacts. When the correct timing is reached, the voltage drop across resistances $n$ and $m$ is rebalanced and motor $q$ stops. Thus the regulating apparatus is entirely automatic and constantly maintains correct timing of the contacts.

In Fig. 2 a slightly different arrangement of control is shown. In this embodiment, coil $p_2$ of relay $p'$ is connected directly to the output of amplifier $l'$, anode current through the discharge tube $h'$ is controlled by the rectifier contacts $a_1$, $a_2$, $a_3$, and the switching over of the tube $h'$ to these contacts, in succession, is accomplished with the aid of switches $s'$, $s''$ operated automatically by conventional means (not shown) in synchronism with operation of the rectifier contacts. In this embodiment, the tube $h'$ becomes conductive upon opening of the rectifier contacts due to the fact that at such instant the shunt from point $z$ in the anode circuit to the cathode via the rectifier contacts $a_1$—$a_3$ and switch $S''$ is broken thereby applying the anode potential to the anode (as distinguished from the Fig. 1 arrangement when tube conduction was cut off by opening of the contacts) and continues until the positive voltage pulse induced in the windings $f_1$, $f_2$, $f_3$ by the commutating reactors $e_1$, $e_2$, $e_3$ is snapped off at the end of the interval of reduced current. Otherwise, the Fig. 2 embodiment of the invention operates in the same manner as the arrangement shown by Fig. 1 and produces the same desirable result of regulating the timing of the rectifier contacts.

In Fig. 3, a somewhat different construction is shown wherein the timing of the rectifier contacts remains fixed i. e. constant overlap, but in which the control quantity (average current in the circuit of tube $h''$) is used to regulate the current flowing through the rectifier contacts. This is accomplished by changing the premagnetization of the commutating reactors $e_1$, $e_2$, $e_3$, which produce the interval of reduced current, as a function of changes in the average current in the circuit of tube $h''$ as measured by the corresponding change in voltage drop across resistor $k''$. This voltage change correspondingly effects a change in the output of amplifier $l''$ which works into relay $p''$.

The reactors $e_1$, $e_2$, $e_3$ may include either or both alternating current and direct current premagnetizing windings. The direct current windings $v_1$, $v_2$, $v_3$ are shown connected in series to a suitable D. C. source in a circuit that includes an adjustable resistance $w$ which would be regulated in one direction or the other by action of relay $p''$ to thereby increase or alternatively decrease the current through these windings. The alternating current windings $t_1$, $t_2$, $t_3$ are shown connected through respective impedances $z_1$, $z_2$, $z_3$ to the output of an induction regulator $u$ that takes power from the polyphase line $b$ and which would also be adapted to be controlled by relay $p''$ to thereby regulate the magnitude and phase of the alternating current premagnetization. If the reactors include both A. C. and D. C. premagnetizing windings and both are regulated by relay $p''$ as shown, the arrangement would be such that the resulting premagnetizing of the commutating reactors remains constant in the moment of opening of their respectively associated rectifier contacts while it is regulated for the closing moment of the contacts.

In conclusion, while certain preferred embodiments of the invention have been shown and described, the invention as defined in the appended claims is not to be so limited. Furthermore it is obvious that the invention may be applied equally as well when the apparatus is used to convert direct current to alternating current rather than from alternating to direct current as described and shown.

Having thus fully described our invention, we claim:

1. A mechanical current converter comprising relatively movable contacts adapted to periodically open and close a circuit between a power source and a load, a control device in said circuit for producing an interval of reduced current to minimize arcing between said contacts, means producing a first electrical control quantity having a magnitude proportional to the actual time at which said contacts open as related to the time of occurrence of said interval of reduced current, means producing a second similar quantity of a selected magnitude, means comparing said quantities to obtain any difference therebetween, and means actuated in accordance with the sense and magnitude of said difference for readjusting an operating characteristic of said converter to reestablish a balance between said quantities.

2. A mechanical current converter comprising relatively movable contacts adapted to periodically open and close a power circuit between a power source and load, a control device in said power circuit for effecting periodic intervals of reduced current to minimize contact arcing, an auxiliary measuring circuit having a discharge tube therein, said tube having cathode and anode elements through which current flows in said measuring circuit and a grid element determining conductivity of the tube in accordance with the bias thereon, means periodically conditioning the anode-cathode circuit of said tube for conduction therethrough in accordance with operation of said converter contacts, and means controlling the grid bias on said tube in accordance with the operation of said control device to render said tube periodically conductive.

3. The invention as defined in claim 2 wherein the contacts of said converter are comprised of a contact bridge disengaged periodically from stationary contact members, and said anode cathode circuit is switched by said contact bridge to periodically condition the same for conduction.

4. The invention defined in claim 2 wherein said control device comprises a reactor and the grid bias of said tube is altered upon the change in voltage at said reactor which produces the said interval of reduced current.

5. The invention defined in claim 2 wherein the anode cathode circuit of said tube is periodically conditioned for conduction of current therethrough by and in synchronism with opening of the converter contacts.

6. The invention defined in claim 2 characterized by the fact that said converter is of the polyphase type including a set of relatively movable contacts for each phase, and that the anode cathode circuit of said tube is switched over to the contact sets in succession.

7. The invention as defined in claim 2 and further including means responsive to any deviation in the average current in the anode cathode circuit of said tube from a selected value for regulating the timing of the converter contacts in accordance with the sense and magnitude of said deviation to restore the average current to the selected value.

8. The invention as defined in claim 2 and further including means responsive to any deviation in the average current in the anode cathode circuit of said tube from a selected value for regulating the current flowing through the converter contacts in accordance with the sense and magnitude of said deviation to restore the average current to the selected value.

9. The invention as defined in claim 2 wherein said control device is a reactor having a premagnetizing winding and the current through this winding is increased or alternatively decreased in accordance with the sense and magnitude of any deviation in the average current flow in the anode cathode circuit of said tube from a selected magnitude.

10. The invention as defined in claim 2 wherein said control device is a reactor having a direct current premagnetizing winding and the current through this winding is increased or alternatively decreased in accordance with the sense and magnitude of any deviation in the average current flow in the anode cathode circuit of said tube from a selected magnitude.

11. The invention as defined in claim 2 wherein said control device is a reactor having an alternating current premagnetizing winding and the current through this winding is increased or alternatively decreased in accordance with the sense and magnitude of any deviation in the average current flow in the anode cathode circuit of said tube from a selected magnitude.

12. The invention as defined in claim 2 wherein said control device is a reactor having an alternating current premagnetizing winding adjustable in magnitude and phase in accordance with any change in the average current in the anode cathode circuit of said tube from a selected magnitude.

13. The invention as defined in claim 2 wherein said control device is a reactor having both direct and alternating current premagnetizing windings, and the currents through these windings are varied in accordance with any departure of the average current flow in the anode cathode circuit of said tube from a selected magnitude.

14. The invention as defined in claim 2 wherein said control device is a reactor having both direct and alternating current premagnetizing windings, the resulting premagnetizing effect of the reactor remaining constant at the moment of contact opening but being varied for the closing moment of said contacts in accordance with any departure of the average current flow in the anode cathode circuit of said tube from a selected magnitude.

ALEXANDER GOLDSTEIN.
HANS BLATTER.

REFERENCES CITED

The following references are of record in the file of this patent:

UNITED STATES PATENTS

| Number | Name | Date |
|---|---|---|
| 1,529,341 | Burnham | Mar. 10, 1925 |
| 2,169,560 | Janetschke | Aug. 15, 1939 |
| 2,181,152 | Rolf | Nov. 28, 1939 |
| 2,188,361 | Koppelmann | Jan. 30, 1940 |
| 2,276,784 | Koppelmann | Mar. 17, 1942 |
| 2,279,729 | Bedford | Apr. 14, 1942 |
| 2,293,296 | Jonas | Aug. 18, 1942 |
| 2,465,682 | Goldstein | Mar. 29, 1949 |